US012541310B2

(12) United States Patent
Ghosh et al.

(10) Patent No.: US 12,541,310 B2
(45) Date of Patent: Feb. 3, 2026

(54) ROUTING OF MEMORY TRANSACTIONS

(71) Applicant: Intel Corporation, Santa Clara, CA (US)

(72) Inventors: Kausik Ghosh, Bangalore (IN); Pratim Bose, Kolkata (IN); Arun Venkatasubbaiah Hodigere, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 18/575,250

(22) PCT Filed: Sep. 15, 2021

(86) PCT No.: PCT/US2021/050499
§ 371 (c)(1),
(2) Date: Dec. 28, 2023

(87) PCT Pub. No.: WO2023/043439
PCT Pub. Date: Mar. 23, 2023

(65) Prior Publication Data
US 2024/0289033 A1   Aug. 29, 2024

(51) Int. Cl.
*G06F 3/06* (2006.01)
(52) U.S. Cl.
CPC .......... *G06F 3/0625* (2013.01); *G06F 3/0634* (2013.01); *G06F 3/0673* (2013.01)
(58) Field of Classification Search
CPC .... G06F 3/0625; G06F 3/0634; G06F 3/0673; G06F 1/3275; G06F 3/0644;
(Continued)

(56) References Cited

U.S. PATENT DOCUMENTS 11,074,188 B2 *   7/2021   Wang .................. G06F 12/0891
2005/0259493 A1 *  11/2005   Walker .................. G11C 11/406
                                                      365/222
(Continued)

FOREIGN PATENT DOCUMENTS

KR   10-2017-0098900 A   8/2017
KR   10-2019-0019203 A   2/2019

OTHER PUBLICATIONS

International Search Report and Written Opinion mailed Jun. 9, 2022 for International Application No. PCT/US2021/050499, 12 pages.
(Continued)

*Primary Examiner* — Zhuo H Li
(74) *Attorney, Agent, or Firm* — Schwabe, Williamson & Wyatt, P.C.

(57) ABSTRACT

An apparatus for processing data is provided comprising persistent memory circuitry, non-persistent memory circuitry and memory controller circuitry. The memory controller circuitry provides two or more memory sub-channels and each memory sub-channel is for routing of memory access transactions for at least one of the persistent memory circuitry and the non-persistent memory circuitry. The memory controller circuitry has channel selection circuitry to detect when there are no non-persistent memory transactions on one of the two or more memory sub-channels and responsive to the detection, is to route any persistent memory transactions to a different one of the two or more memory sub-channels. A memory controller apparatus, a persistent memory Dual In-line Memory Module, a method and computer program are also provided.

20 Claims, 4 Drawing Sheets

(58) Field of Classification Search
CPC ........ G06F 1/3225; G06F 3/068; G06F 9/467; G11C 11/40615; G11C 5/04; Y02D 10/00
See application file for complete search history.

(56) References Cited

U.S. PATENT DOCUMENTS

| | | |
|---|---|---|
| 2012/0306902 A1 | 12/2012 | Macwilliams et al. |
| 2013/0042127 A1* | 2/2013 | Thomas ................ G06F 1/3275 713/323 |
| 2018/0059966 A1* | 3/2018 | Lee ......................... G06F 13/28 |
| 2023/0055349 A1* | 2/2023 | Ramesh ................ G06F 3/0604 |

OTHER PUBLICATIONS

International Preliminary Report on Patentability mailed Apr. 4, 2024 for International Application No. PCT/US2021/050499, 9 pages.

\* cited by examiner

Figure 4

ROUTING OF MEMORY TRANSACTIONS

RELATED APPLICATIONS

The present application is a national phase entry under 37 U.S.C. § 371 of Int'l App. No. PCT/US2021/050499, filed Sep. 15, 2021, which designated, among various States, the United States of America, the content of which is hereby incorporated by reference in its entirety and for all purposes.

TECHNICAL FIELD

Embodiments described herein generally relate to the field of memory transactions. More particularly, embodiments relate to routing of memory transactions in processing systems having both persistent and non-persistent memory.

BACKGROUND

Memory hierarchies in processing systems have been evolving to adapt to computing demands for ever increasing storage capacity, reduced access latency, improved power efficiency and better reliability. Dynamic Random Access Memory (DRAM) has been available since the 1940s and NAND flash memory has been available since the 1980s. DRAM is non-persistent (or volatile) and requires power to retain stored data memory, whereas NAND is one example of persistent (or non-volatile) memory. DRAM may be used for a processing system's main memory. NAND memory has a finite number of write cycles so wears out over time and has a higher access latency than DRAM. DRAM has superior performance to NAND but is more expensive and less dense, so more DRAM modules are needed to reach the same given memory capacity as NAND. Static Random Access Memory (SRAM) was introduced as a caching layer to accommodate increasing processor clock speeds and to bridge the latency gap between DRAM and NAND. Multi-level caches are now prevalent. SRAM is faster and more expensive than DRAM.

Dual In-Line Memory Modules (DIMMs) comprise a series of DRAM circuits (devices) mounted on a printed circuit board and may be used in personal computers, workstations and servers. DIMMs initially became popular because they had a 64-bit data path to match a 64-bit processor bus width. DDR4 SDRAM has a high bandwidth ("Double Data Rate") interface and transfers data on both rising and falling edges of a clock signal to double the data bus bandwidth without a corresponding increase in clock frequency. DIMMs initially tended to be installed on a memory bus and used only for volatile memory. However, more recently, DIMMs have also been used for non-volatile memory and installed alongside volatile memory on the same memory bus. These two different types of DIMMs (persistent and non-persistent) can provide a main memory capable of both high performance and low latency.

A "memory rank" is a set of DRAM chips connected to the same chip select signal and hence may be accessed simultaneously. Chip select pins for each "rank" are separate whereas data pins may be shared across all ranks if appropriate. Thus different memory ranks can be accessed independently but not simultaneously. DIMMs may have one or more than one memory rank. DDR devices have a "self refresh" mode, which is a low power mode in which the clock (or clocks) is deactivated to reduce power consumption and yet data is held by using an internal refresh counter to execute a refresh operation.

Power consumption in processing systems such as present day data centres is often substantial and it is desirable to reduce the power footprint. Power management units (PMU) may be used to keep a power budget of processing system within a target range. There are several methods through which the PMU can achieve power savings in a processing system.

One of these power saving methods is to use the DRAM self-refresh mode at a memory rank level if there are no pending transactions to that rank in internal queues of the Memory Controller. New types of power savings are often sought by chip designers.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems and apparatuses and machine-readable instructions for memory transaction routing in a data processing apparatus.

Figure 1:
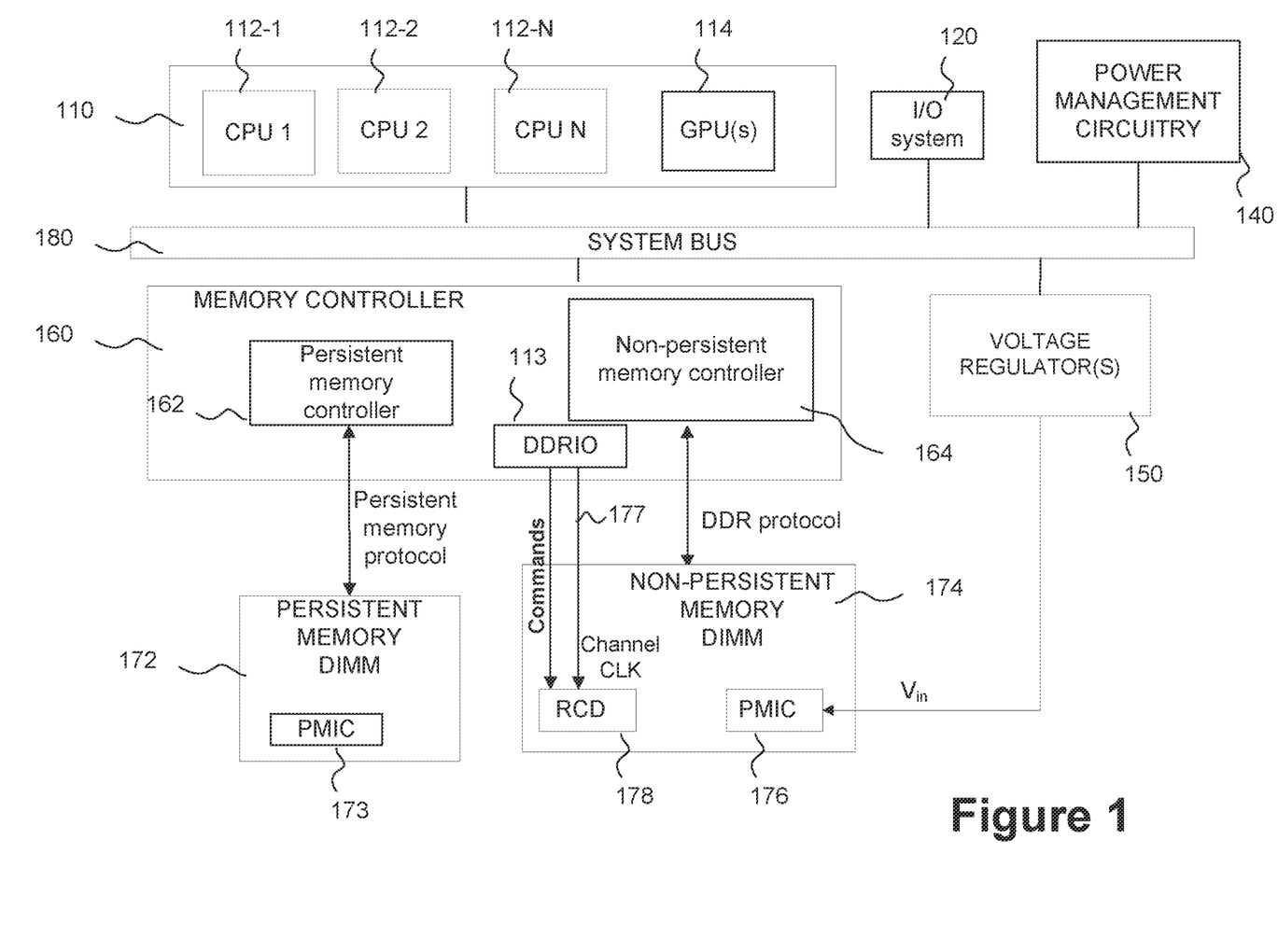
FIG. 1 schematically illustrates a data processing apparatus comprising both a persistent memory DIMM and a non-persistent memory DIMM on a single channel.

FIG. 1 schematically illustrates a data processing apparatus. The apparatus comprises a set of processing circuitry 110 including a plurality of central processing units (CPUs) 112-1, 112-2 to 112-n and one or more Graphics Processing Units (GPUs) 114. The memory controller 160 has a SOC DDRIO 113 which is circuitry comprising Double Data Rate Input and Output channels in the memory controller 160 that connect to traces that feed into the DIMMs 172, 174. The SOC DDRIO 113 may consume power that is a function of the bandwidth of both any reads and writes that it is driving. There may be an additional power cost to the data processing apparatus due to having two or more DIMMs, but this is a second order impact relative to the read and write bandwidth. Many high DDRIO-power workloads do not involve correspondingly heavy processing circuitry power, whereas processing-centric workloads tend to have low or moderate DDRIO usage.

The apparatus 100 further comprises an I/O system 120, a set of power management circuitry 140, a voltage regulator(s) 150, a memory controller 160 having a persistent memory controller component 162 to interface with a persistent memory DIMM 172 and a non-persistent memory controller component 164 to interface with a non-persistent memory DIMM 174. There may be more than one voltage regulator, but a single voltage regulator 150 is shown in FIG. 1 as a simplified example. Similarly, memory controller 160 is illustrated in FIG. 1 as a single set of circuitry for ease of illustration, but in some examples there may be a plurality of memory controller instances on the integrated circuit in a similar way to there being a plurality of CPUs 112-1 to 112-N. All of the components are arranged to have a communication path with other apparatus components via, for example, the system bus 180. Other buses (not shown) may be provided, such as a DDR bus. The persistent memory DIMM 172 has a local Power Management Integrated Circuit (PMIC) 173. The non-persistent memory DIMM 172 also has a local Power Management Integrated Circuit (PMIC) 176 and further comprises a Register Clock Driver (RCD) 178.

The power management circuitry 140 may control supply of power to one or more components of the processing system 100. The power management circuitry 140 may be coupled to at least one of the voltage regulator(s) 150, the processing circuitry 110, the I/O system 120 and the memory controller 160. The power management circuitry 140 may control at least one of an operating frequency, an operating current, or an operating voltage to manage power consumption of one or more CPU(s) 112-1 to 112-n and GPU(s) 114 to maintain a threshold average power within certain limits over a given time period. The power management circuitry 140 may implement one or more power limiting algorithms to limit a duration of power spikes above, or to prevent voltage spikes below corresponding power limits. The Voltage Regulator(s) 150 may supply an input voltage, Vin, to the local PMIC 176 of the non-persistent memory DIMM 174. The local PMIC 176 may split this Vin into two or more different voltage rails for use within the non-persistent memory DIMM 174.

The DDRIO 113 may also receive a voltage supply from the motherboard voltage regulator(s) 150. Note that voltage rail ramp-up and ramp-down can be time consuming and according to the present technique, power savings may be achieved at least within the non-persistent memory DIMM on a relatively faster time scale than may be possible via voltage ramp-down. Generally the frequency of memory is not particularly important. Running at lower voltages can limit the achievable frequency on a memory system such as a DDR system and the frequency can impact a maximum amount of power that a DIMM can consume, but the power to run the majority of memory workloads is not particularly sensitive to frequency and thus reducing memory frequency may be of limited benefit. The PMIC 176 enables configurability of voltage ramps and levels and current monitoring and it also enables threshold protection, error injection capabilities, programmable power-on sequence as well as power management features. The PMIC 176 also distributes the VDD supply, helping with signal integrity and noise. The presence of the local PMICs 173 and 176 enables better DIMM level power regulation and reduces a complexity of the motherboard design by reducing the scope of the DRAM and persistent memory power delivery networks.

The non-persistent memory DIMM 174 may comprise any one of a number of different types of non-persistent memory. However, in this example, the non-persistent memory DIMM is a DDR5 DIMM. The Joint Electron Device Engineering Council (JEDEC) has defined a number of different categories of DRAM depending on power, performance and area specifications. A popular variant of DDR is DDR4 which offers data rates of up to 3200 M bits/s, an operating voltage of 1.2V, as well as performance enhancements via the use of memory bank groups and densities per die of up to 16 Gbit. DDR5 is a JEDEC DDR variant that may increase data rates relative to DDR4 up to 4800 M bits/s at an operating voltage of 1.1V. DDR5 offers the DIMM level PMICs 173, 176, improved memory refresh, more effective use of data channels than DDR4, larger memory bank groups to boost performance and makes it easier to support larger memory capacities. Furthermore, it offers updated memory architectures to more efficiently use data channels. A key difference between DDR5 and DDR4 is the introduction of sub channels to DDR5. There are two independent subchannels in DDR5, each subchannel having up to two physical package ranks. According to the JEDEC DDR5 specification JESD79-5 of July 2020, it is possible to put one of two ranks of a given sub channel in a self refresh mode and yet keep the other rank of the sub-channel active. To put such a sub channel with only one of two ranks in self refresh mode in a low power mode could potentially be achievable if the DDR5 data of the active rank could be re-routed to a different sub channel. To match the DDR4 data payload per transaction with the sub channel layout, DDR5 burst length has increased from 8 to 16. This doubling of the burst length means that the number of data inputs/outputs used to meet the same amount of data for a given system access size can be halved and this facilitates the two subchannels. For example, 32 data I/Os with a burst length of 16 can result in 64-byte payloads and a read operation from two subchannels combined can provide an output of 128 bytes. The two independent sub channels introduced in DDR5 can increase concurrency and may facilitate better memory access scheduling by the memory controller 160. The DDR5 channel architecture is a 40-bit data channel (32 data+8 Error Correction Code) and two channels per DIMM. By way of contrast, DDR4 has a 72 bit data channel (64 data+8 ECC) and a single channel per DIMM.

A single clock (CLK) signal 177 from the DDRIO 113 of the System on Chip (SOC) is supplied as an input to the RCD 178 of the non-persistent memory DIMM 174. This single CLK signal 177 is divided into two signals by the RCD 178 to support the two independent DDR5 sub channels. If any one of the two sub channels is active then the CLK signal 177 from the DDRIO 113 is still being utilized so should not in previously known systems be turned off to save power. However, within the RCD 178, according to the present technique one of the two sub channel clock signals can be stopped if the subchannel currently has no active traffic.

In DDR4 the RCD 178 would provide two output clocks per left side and two output clocks per right side. In DDR5 each of the left and right sides of the DIMM is served by an independent 40-bit wide channel sharing the RCD 178 which provides four output clocks per side. In the highest density DIMMs with ×4 DRAMs this allows each group of 5 DRAMs (single rank, half channel) to receive its own independent clock. Giving each rank and sub-channel an independent clock improves signal integrity. A further input to the RCD 178 is memory access commands for the non-persistent memory DIMM 174. By way of contrast the two sub-channels of 40 data pins each are not routed through the RCD.

The persistent memory DIMM 172 exists on the same system bus 180 alongside the non-persistent memory DIMM 174 and can work in conjunction with it to achieve a higher overall memory capacity or to achieve better performance through DRAM caching. The non-volatile nature of the memory on the persistent memory DIMM 172 means that it can retain data when the processing system is either shut down or experiences a power loss. Thus the system memory having both DIMM components 173, 174 can be used as a form of permanent storage similar to hard disk drives or solid state drives, but with system memory like latencies.

Thus more data can be kept closer to the processing circuitry 110 for faster processing. The present technique is applicable to any processing system having persistent memory configuration support at the system memory level. The persistent memory controller 162 may interface with the persistent memory DIMM 172 using a dedicated persistent memory protocol such as, for example, the Intel proprietary DDR-T or DDRT2 protocols which support asynchronous commands and data timing for improved control relative to previous CPU-managed DIMMs. The data bus direction and timing may be controlled by the host memory controller 162 via the persistent memory protocol. The non-persistent memory controller 164 may interface with the non-persistent memory DIMM 174 using a protocol such as the JEDEC DDR protocol, which has been standardized since 2000 and updated a number of times since then. Both the persistent memory protocol and the DDR protocol may be provided on the same physical bus, which is a DDR bus (not shown) connected to the DIMMs 173, 176.

Figure 2:
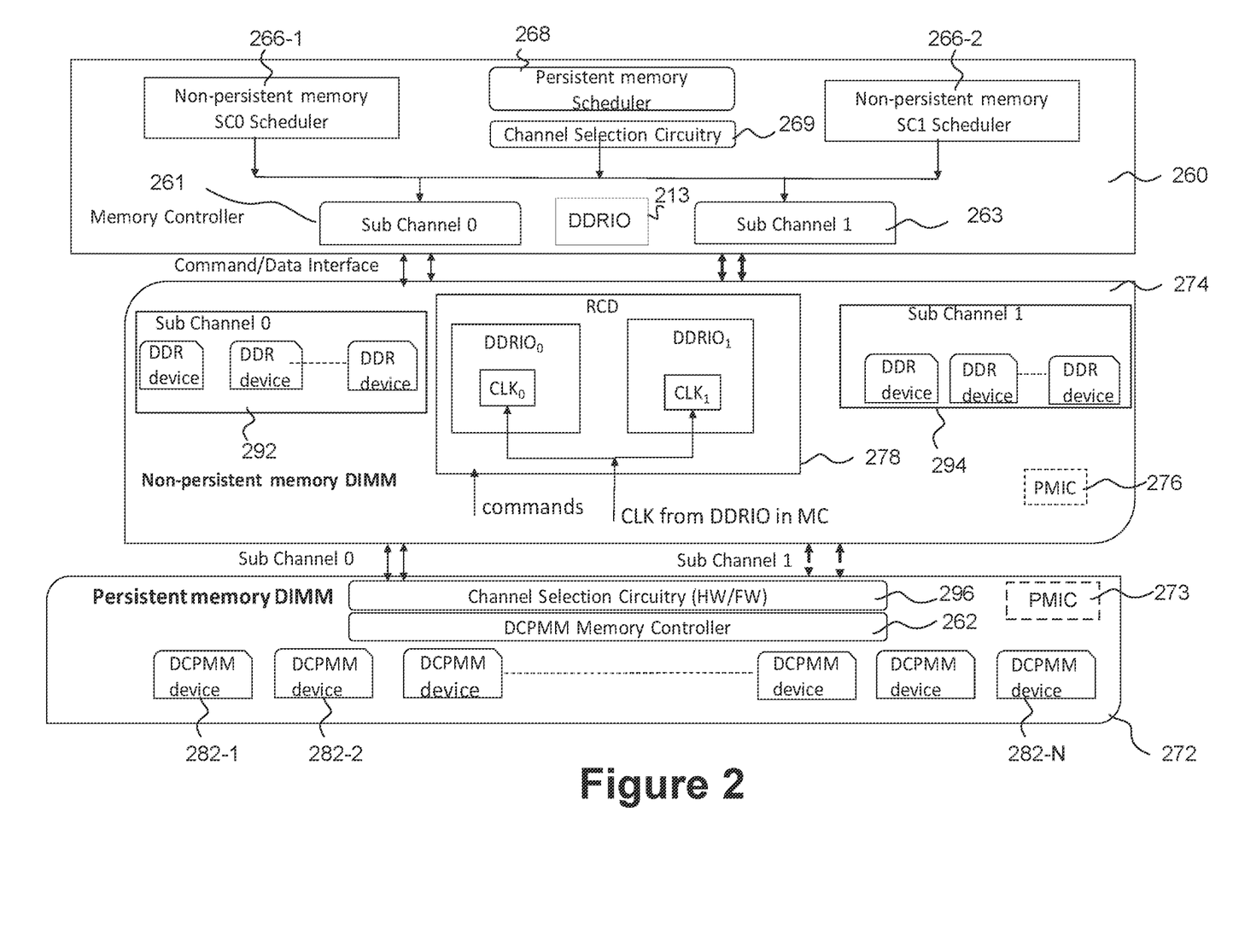
FIG. 2 schematically illustrates the two different DIMMs of FIG. 1 in more detail and shows how the memory controller provides two sub-channels of the single channel for performing memory transactions.

FIG. 2 schematically illustrates the persistent and non-persistent memory DIMMs of FIG. 1 in more detail and shows how the global memory controller provides two distinct sub-channels 261 and 263 for performing memory transactions. The two distinct sub-channels may be DDR5 sub-channels. More than two sub-channels may be provided in other examples. FIG. 2 shows a memory controller 260 having memory transaction scheduling circuitry t266-1, 266-2, 268 to schedule persistent memory transactions with a persistent memory DIMM 272 and non-persistent memory transactions with a non-persistent memory DIMM 274. The memory controller 260 may be viewed as a global memory controller due to controlling both persistent and non-persistent memory transactions rather than just one or the other. As part of the memory controller 260 there is a first non-persistent memory "SC0" scheduler 266-1 to schedule memory transactions on sub channel 0 and a second non-persistent memory "SC1," scheduler 266-2 to schedule memory transactions on sub channel 1. Memory transactions destined for the persistent memory DIMM 272 are also scheduled across the two distinct DDR5 sub-channels 261, 263 by a corresponding persistent memory scheduler 268. The persistent memory DIMM has a PMIC 272 to locally manage power, similar to a corresponding component in the non-persistent memory DIMM 274.

According to the present technique, if it is established that there is no active DDR5 traffic on either SC0 or SC1 and yet there is active persistent memory traffic on the sub-channel that has no DDR5 traffic, then the persistent memory traffic may be redirected to ensure that it is preferentially serviced on a sub-channel that does currently have active DDR5 traffic. To perform the function of preferentially selecting a sub-channel to which to route active persistent memory traffic to avoid a subchannel that has no active non-persistent memory traffic, a first set of channel selection circuitry 269 is provided to cooperate with the persistent memory scheduler 268 to select an appropriate sub channel. The first channel selection circuitry 269 may determine the appropriate sub-channel in any one of a number of different ways, such as by performing a check as to whether or not one or more of the DDR devices 292 of subchannel 0 or one or more of the DDR devices 294 of sub-channel 1 is currently in a power-reduced mode such as a self-refresh mode. The first channel selection circuitry 269 may preferentially direct any active persistent memory transactions to a sub channel that either is not currently in or is not expected to imminently transition into a reduced power mode due to a low volume of or an complete absence of active DDR5 transactions.

The non-persistent memory DIMM 274 comprises a first plurality of DDR devices 292 corresponding to sub channel 0 and a second plurality of DDR devices 294 corresponding to sub-channel 1. In one example, where the non-persistent memory DIMM 275 is a DDR5 DIMM, each of the two distinct sub-channels may have one or more ranks of DDR devices. In one implementation, a single rank in DDR5 comprises ten DDR devices each occupying 4 of the 40 pins of the associated sub channel. In some examples the non-persistent memory DIMM 274 may have a single rank per sub channel but in other examples it may have two or more ranks per sub-channel.

According to the present technique, one or more ranks of DIMM devices 292, 294 may be put into self-refresh mode. The self-refresh mode may be implemented using a refresh counter 340 as described below with reference to FIG. 3. The non-persistent memory DIMM 274 also comprises a local PMIC 276 and an RCD 278. As in FIG. 1, the RCD 278 receives a CLK from DDRIO circuitry 213 in the memory controller and commands. Memory transaction data is received by the DDR devices 292 via a first set of 40 pins (in this DDR5 example) and memory transaction data is received by the DDR devices 294 via a further set of 40 pins. The CLK from the DDRIO circuitry 213 is split into two signals within the RCD 278 with a first child clock signal $CLK_0$ serving the sub-channel 0 and associated $DDRIO_0$ and a second child clock signal $CLK_1$ serving the sub-channel 1 and associated $DDRIO_1$. In a current version of the JEDEC DDR5 specification "DDR5 SDRAM" JESD79-5 published in July 2020 and accessible at https://www.jedec.org/standards-documents/docs/jesd79-5, at least some of the pins are common to the two distinct sub channels. In the current version of the DDR5 standard there are 40 pins per sub channel giving a total of 80 pins per DIMM in this example, but the number of pins could be different in other examples. Thus even if there is currently no active traffic on one of the two sub channels, say sub channel 0, then it could be appropriate to keep DDRIO clock(s) for both sub-channels on as illustrated in the upper portion of FIG. 4 (described below).

Figure 4:
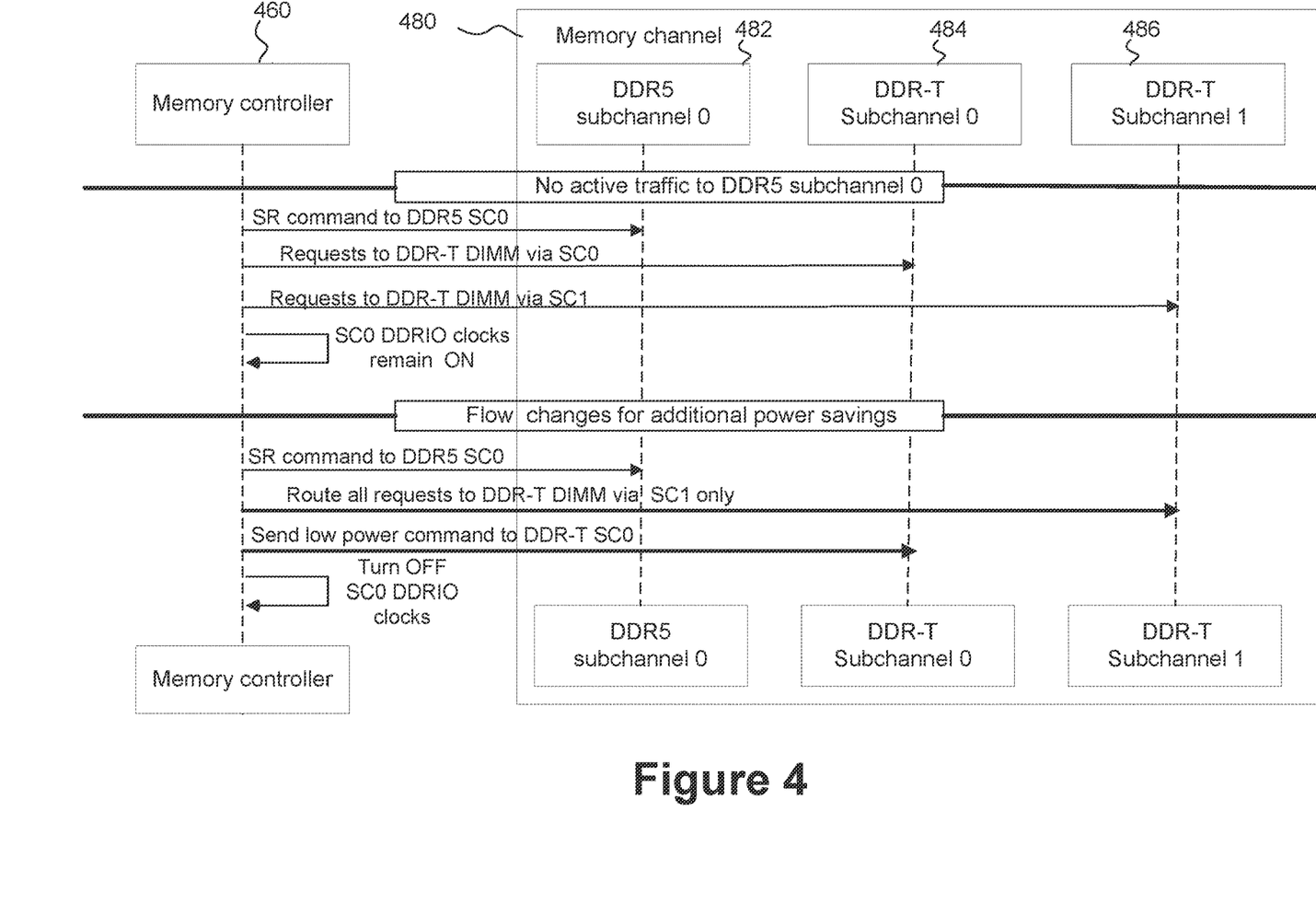
FIG. 4 schematically illustrates a signal flow between a memory controller and a single memory channel and component sub channels in the apparatus of FIG. 1 or FIG. 2.

FIG. 4 schematically illustrates a signal flow between a memory controller 460 and a single memory channel 480 in the apparatus of FIG. 1 or FIG. 2. The memory channel 480 comprises a single DDR5 sub-channel 0, 482, a persistent memory subchannel 0, 484, and a further persistent memory subchannel 1, 486. Note that the persistent memory sub-channel 0 484 and the DDRT 5 subchannel 0 represent different logical channels sharing bandwidth on the same physical channel, subchannel 0.

The upper half of FIG. 4 schematically illustrates a signal flow as might occur when implementing self-refresh upon a DDR5 sub-channel without applying the persistent memory traffic scheduling of the present technique. The present technique comprises utilizing a single sub channel mode when a sub channel has no active DDR5 (or other similar non-persistent memory) traffic. At the outset, the memory controller 460 establishes via scheduling information (or otherwise) that there are currently no active DDR5 transactions on the subchannel 0 As a consequence the memory controller issues a self refresh (SR) command to DDR 5 subchannel 0 482, but also continues to issue memory transactions as requests to the persistent memory DIMM via sub-channel 0 and to issue further requests to the persistent memory DIMM via sub channel 1. Despite there being no active DDR5 traffic on sub-channel 0, the sub-channel 0 DDRIO clocks (see the clock signal $CLK_0$ in the DDRIO of the RCD 278 in FIG. 2) remain on and this is appropriate due to the persistent memory traffic remaining on sub-channel 0.

The lower half of FIG. 4 schematically illustrates a signal flow as might occur when implementing self-refresh upon a DDR5 sub-channel when applying the present technique. According to the present technique when there is no active traffic to DDR5 sub-channel 0, similarly to the upper portion of FIG. 4, a self refresh command is issued by the memory controller 460 to at least one rank of DDR devices corresponding to sub-channel 0. The memory controller also, responsive to determining the absence of DDR5 traffic on sub-channel 0 routes all incoming persistent memory transactions to sub-channel 1 of the persistent memory DIMM, avoiding any further transaction allocations to sub-channel 0. Although this command diverts any incoming transactions away from sub-channel 0, at the time all active DDR5 traffic on sub-channel 0 stopped, data buffers in the persistent memory DIMM with data destined for sub-channel 0 may have been storing data. However, the second channel selection circuitry 296 may be used to route any such buffered traffic upstream to the memory controller 460 to be diverted from sub-channel 0 to sub channel 1. The present technique can be implemented without any direct communication between the first channel selection circuitry 269 and the second channel selection circuitry 296. In some examples the power management circuitry 140 may coordinate the activities of the first and second channel selection circuitry 269,296 to implement the communication flow sequence as illustrated in FIG. 4. The absence of any active traffic, persistent and non-persistent from sub-channel 0 means that a low power command can be sent to sub channel 0. Furthermore the memory controller 420 can send a command to the RCD 278, instructing the RCD 279 to turn off the sub channel zero clock(s) $CLK_0$ in the $DDRIO_0$.

Note that although it might be assumed that any period when there is no active traffic on one of the distinct sub channels could be infrequent for certain data processing systems such as in a server environment where memory interleaving may be heavily used, this is not the case. In fact, when a data processing system has both DDR5 and persistent memory DIMMs 272 on the same DDRIO channel and where the persistent memory DIMM 272 s operating in a persistent mode, a workload is likely to have two disjoint address ranges, one for DDR5 and another for persistent memory (e.g. DDRT or DDRT2). The workload may choose either one or the other of these address ranges and thus there is an expectation that memory accesses to the DDR5 DIMM 274 and the persistent memory DIMM 272 are unlikely to by synchronized. Thus there is an expectation that there will be frequent periods when there is no active DDR5 traffic to one or both sub channels despite there being active persistent memory traffic on at least one of the sub-channels.

Figure 3:
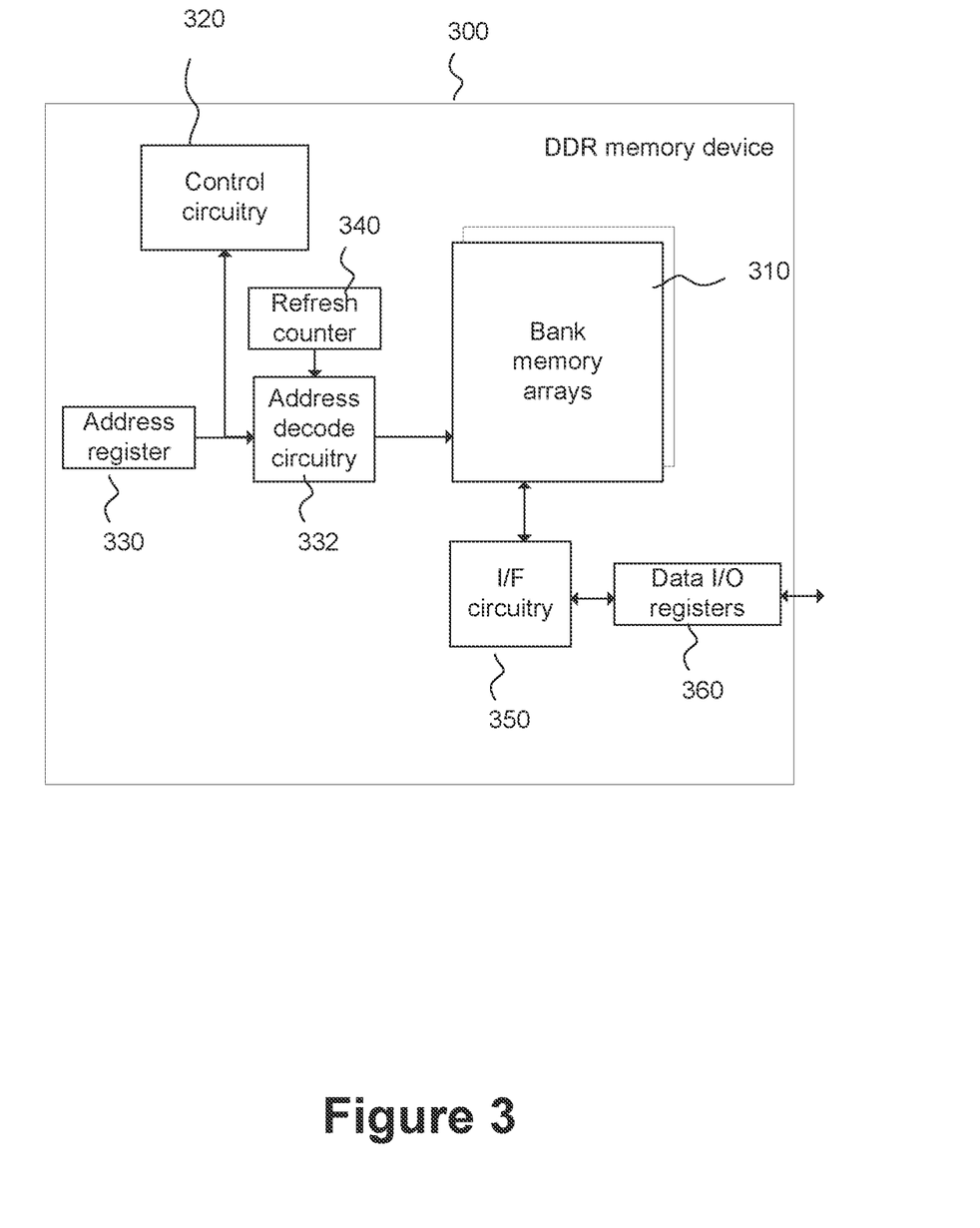
FIG. 3 schematically illustrates components of a Double Data Rate (DDR) non-persistent memory device including a refresh counter to implement a self-refresh mode.

FIG. 3 schematically illustrates internal components of one of the DDR devices 292, 294 of the non-persistent memory DIMM 274 of FIG. 2. The DDR device 300 comprises a bank of memory arrays 310, control circuitry 320, an address register 330 which supplies addresses to a set of address decode circuitry 332. A refresh counter 340 may be set to place the bank memory arrays 310 in a self refresh mode. In some examples all DDR devices belonging to the same rank on the non-persistent memory DIMM 274 are placed in a self-refresh mode simultaneously. The DDR device also comprises interface circuitry 350 and a set of data input/output register 360.

DRAM devices (unlike SRAM) may be periodically refreshed in order to keep the data valid. Refreshing memory comprises simply reading the data out of the bank memory arrays 310 and writing the data back in again. During normal operation, the non-persistent memory controller 164 (see FIG. 1) periodically issues refresh commands to refresh a portion of the device. The entire device is refreshed periodically (say on the order of tens of milliseconds). When a given channel is not being used, it is possible to put one or more DIMMs on that channel into a self refresh state where the DIMM itself is responsible for handling self refresh. This state both saves power on the DIMM and allows for additional power to be saved in the processing circuitry, memory controller and I/Os. For example, the data I/O registers and perhaps the associated I/F circuitry may also be put in a low power mode when self-refresh is implemented.

The additional power savings may come with a latency cost. There are different modes of self-refresh that provide different power savings and have different latency characteristics. Self refresh with clock stop and self refresh without clock stop are two examples of different self refresh modes. The clock signals in some examples may be a pair of differential clock signals used to drive data between the processing circuitry 110 and the non-persistent memory DIMM 174.

For self refresh (SR) with clock stop the SR exit time may be around ×2 one refresh cycle time for 16 Gb devices and around 3× of one refresh cycle time for 8 Gb devices. However, REF, ACT and few other commands can be issued after only a single refresh cycle time in both cases. Any request can experience one refresh cycle delay randomly even in active mode, i.e. even without the channel being in self refresh. Any adverse impact of self refresh exit time on memory traffic may be further reduced with some early detection of incoming traffic.

In systems prior to the present technique self-refresh was performed at a channel granularity rather than a sub-channel granularity and it tended to have longer exit latencies, so it was often used for saving power when the data processing system was completely idle. Self refresh residencies in active systems have been low prior to the present technique, according to which whereby one or more sub channels may be place in a self refresh mode and at the same time persistent memory transactions can be diverted to a different sub channel to improve the power savings potential.

According to the present technique idle power can be saved on 40 DQ (data) pins, 10 pairs of DQS (data strobe) pins and one sub-channel command bus on the non-persistent memory DIMM 174 and the DDRIO 113 for ×4 DDR5 DIMMs. The self refresh on a DDR5 DIMM 274 can save substantial power on the system and the present technique provides opportunities to have self-refresh (with/without clock stop) in the DDR5 DIMMs at a sub channel level in a data processing apparatus where DCPMM DIMMs are installed alongside DDR5 DIMM on same channel and in scenarios where traffic to persistent memory DIMM 172 is still happening while DDR5 traffic is not available for at least a short span of time. Furthermore, the self refresh with clock stop mode is paired with voltage and frequency scaling power control (e.g. "C states") implemented by the power management circuitry 140 then any self-refresh latency (if significant) can potentially be offset by performing it in parallel with any long latency operations such as changing an operating voltage or locking phase locked loops.

In FIG. 2 the persistent memory DIMM 272 comprises a plurality 282-1 to 282-N of persistent memory devices such as DC Persistent Memory devices (DCPMM), which are controlled by a DCPMM memory controller 262 that is local to the persistent memory DIMM 272. The persistent memory DIMM 272 of the FIG. 2 example has both a single sub channel mode of operation and a dual-channel mode of operation. According to the present technique, a new set of circuitry comprising second channel selection circuitry 296 is provided as part of the persistent memory DIMM 272. This second channel selection circuitry 296 performs the function of routing any pending traffic local to the persistent memory DIMM 272 back upstream to the memory controller 260 so that a sub channel can be appropriately selected for that traffic in the event that the persistent memory scheduler has recently or is in the process of diverting persistent memory traffic from one sub channel to a different sub channel to minimize the active traffic of any type on one of the two sub-channels. T The memory controller 260, perhaps in cooperation with the DCPM memory controller 262 of the persistent memory DIMM 272, may put the persistent memory DIMM 272 in the single sub channel mode of operation to select the sub channel having the most active DDR5 traffic. The presence of the second channel selection circuitry 296 allows any delay that might otherwise have to be incurred in triggering implementation of the the self-refresh process to "retire" the pending persistent memory transactions on sub channel 0 in the DIMM. Any delay in invoking the self refresh when DDR5 activity on one of the sub-channels falls away could otherwise negatively impact the power saving opportunity that is available.

The persistent memory DIMM of the examples described above may be implemented as, for example, an Intel® Optane™ DC persistent memory (DCPMM) and may implement a proprietary Intel protocol such as the DDR-T protocol.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

The following examples pertain to further embodiments.

EXAMPLES

Example 1 is an apparatus for processing data comprising:
persistent memory circuitry;
non-persistent memory circuitry;
memory controller circuitry to provide two or more memory sub-channels, each memory sub-channel for routing of memory access transactions for at least one of the persistent memory circuitry and the non-persistent memory circuitry;
wherein the memory controller circuitry comprises channel selection circuitry to detect when there are no non-persistent memory transactions on one of the two or more memory sub-channels and responsive to the detection, to route any persistent memory transactions to a different one of the two or more memory sub-channels.

Example 2 may be the apparatus of example 1, comprising power management circuitry to transition the one memory sub-channel from a higher power mode to a lower power mode responsive to detection of there being no non-persistent memory transactions on the sub-channel.

Example 3 may be the of example 1 or example 2, wherein the memory controller circuitry comprises a global memory controller component to control both the persistent memory transactions and the non-persistent memory transactions and comprises a local memory controller component dedicated to controlling the persistent memory transactions.

Example 4 may be the apparatus of example 3, wherein the local memory controller component is to route any persistent memory transactions upstream to the global memory controller and wherein the global memory controller is to allocate one of the two or more memory sub-channels for routing of the persistent memory transactions.

Example 5 may be the apparatus of example 4, wherein the global memory controller comprises a persistent memory scheduler to schedule persistent memory transactions and at least one non-persistent memory scheduler to schedule non-persistent memory transactions.

Example 6 may be the apparatus of example 5, wherein the global memory controller component is either a part of the persistent memory scheduler or cooperates with the persistent memory scheduler to route the persistent memory transactions to one of the two or more memory sub-channels.

Example 7 may be the apparatus of example 2, wherein at least one of the non-persistent memory circuitry and the persistent memory circuitry comprises a Dual Inline Memory Module, DIMM.

Example 8 may be the apparatus of example 7, wherein the non-persistent memory circuitry is a DIMM comprising a plurality of Double Data Rate, DDR, memory devices.

Example 9 may be the apparatus of example 7, wherein the one memory sub-channel on which there are no non-persistent memory transactions is a DDR sub-channel and wherein the transitioning of the DDR sub-channel to the lower power mode comprises the memory controller circuitry issuing a self-refresh command to the DDR sub-channel.

Example 10 may be the apparatus of example 8, wherein the DIMM comprises DDR Input/Output circuitry and wherein the transitioning of the one memory sub-channel to the lower power mode further comprises sending a control signal to turn off a clock to the DDR Input/Output circuitry.

Example 11 may be the apparatus of any one of examples 7 to 10, wherein the DDR memory devices of the DIMM comply with the Joint Electron Device Engineering Council, JDEC, DDR5 memory specification or later.

Example 12 may be the apparatus of any one of examples 1 to 11, comprising processing circuitry to issue one or more memory transactions for the persistent memory circuitry or the non-persistent memory circuitry Example 13 is a dual inline memory module, DIMM, comprising:
  two or more persistent memory devices;
  local memory controller circuitry to control processing of persistent memory transactions corresponding to one or more of the persistent memory devices using two or more memory sub-channels, the two or more memory sub-channels to be shared with transactions of a non-persistent memory DIMM;
  channel selection circuitry to redirect any currently pending persistent memory access transactions corresponding to one of the two or more memory sub-channels for which there are currently no active persistent memory transactions, wherein the redirection is to divert any pending transactions away from the one memory sub-channel to a different memory sub-channel.

Example 14 may be the DIMM of example 13, wherein the pending memory transactions of the one memory sub-channel are redirected upstream to global memory controller circuitry having scheduling circuitry for both the persistent memory DIMM and the non-persistent memory DIMM.

Example 15 is a global memory controller circuitry comprising:
  first scheduling circuitry to schedule memory transactions corresponding to non-persistent memory transactions;
  second scheduling circuitry to schedule memory transactions corresponding to non-persistent memory transactions; and
  channel selection logic to select from two or more sub-channels, at least one sub-channel for servicing persistent memory transactions, the selection to avoid a sub-channel currently in a self-refresh mode of operation for processing the persistent memory transactions.

Example 16 may be the global memory controller circuitry of example 15, wherein at least one of the non-persistent memory transactions and the persistent memory transactions are DIMM transactions.

Example 17 may be the global memory controller of example 15, wherein the persistent memory transactions are to be performed by a persistent memory DIMM and wherein the channel selection logic is to put the persistent memory DIMM in a single sub-channel mode to avoid the sub-channel currently in the self-refresh mode of operation with respect to the non-persistent memory.

Example 18 is a method of routing memory transactions, the method comprising:
  providing two or more memory sub-channels, each memory sub-channel for routing of memory access transactions for at least one of a persistent memory device and a non-persistent memory device;
  detecting an absence of non-persistent memory transactions on one of the two or more memory sub-channels and responsive to the detection, routing any persistent memory transactions to a different one of the two or more memory sub-channels for servicing.

Example 19 may be the method of example 18, comprising in response to there being no non-persistent memory transactions on one of the two or more memory sub-channels, issuing a self-refresh command to the one memory sub-channel to perform self-refresh in a non-persistent memory device.

Example 20 is machine readable instructions provided on a transitory or non-transitory medium, the instructions to implement the method of example 18 or example 19.

Example 21 is means for processing data comprising:
  means for persistent storage of data;
  means for non-persistent storage of data;
  means for controlling memory and for providing two or more memory sub-channels, each memory sub-channel for routing of memory access transactions for at least one of the means for persistent storage of data and the means for non-persistent storage of data;
  wherein the means for controlling memory comprises means for channel selection to detect when there are no non-persistent memory transactions on one of the two or more memory sub-channels and responsive to the detection, to route any persistent memory transactions to a different one of the two or more memory sub-channels.

Example 22 is means for controlling memory comprising:
  means for performing a first scheduling to schedule memory transactions corresponding to non-persistent memory transactions;
  means for performing a second scheduling to schedule memory transactions corresponding to non-persistent memory transactions; and
  means for channel selection to select from two or more sub-channels, at least one sub-channel for servicing persistent memory transactions, the selection to avoid a sub-channel currently in a self-refresh mode of operation for processing the persistent memory transactions.

Example 23 is the means of example 21 or example 22, comprising means for controlling power to transition the one memory sub-channel from a higher power mode to a lower power mode responsive to detection of there being no non-persistent memory transactions on the sub-channel.

Example 24 is an integrated circuit, comprising:
two or more means for persistent storage of data;
means for control processing of persistent memory transactions corresponding to one or more of the means for persistent storage using two or more memory sub-channels, the two or more memory sub-channels to be shared with transactions of a means for non-persistent storage of data;
means for channel selection to redirect any currently pending persistent memory access transactions corresponding to one of the two or more memory sub-channels for which there are currently no active persistent memory transactions, wherein the redirection is to divert any pending transactions away from the one memory sub-channel to a different memory sub-channel.

Example 25 is the integrated circuit of example 24, comprising means for controlling power to transition the one memory sub-channel from a higher power mode to a lower power mode responsive to detection of there being no non-persistent memory transactions on the sub-channel.

The invention claimed is:

1. An apparatus for processing data comprising:
persistent memory circuitry;
non-persistent memory circuitry; and
memory controller circuitry to provide two or more memory sub-channels, each memory sub-channel for routing of memory access transactions for at least one of the persistent memory circuitry and the non-persistent memory circuitry;
wherein the memory controller circuitry comprises channel selection circuitry to detect when there are no non-persistent memory transactions on one of the two or more memory sub- channels and responsive to the detection, to route any persistent memory transactions to a different one of the two or more memory sub-channels, wherein the channel selection circuitry preferentially directs persistent memory transactions to a sub-channel that has active non- persistent memory traffic.

2. The apparatus of claim 1, comprising power management circuitry to transition the one memory sub-channel from a higher power mode to a lower power mode responsive to detection of there being no non-persistent memory transactions on the sub-channel.

3. The apparatus of claim 2, wherein at least one of the non-persistent memory circuitry and the persistent memory circuitry comprises a Dual Inline Memory Module, DIMM.

4. The apparatus of claim 3, wherein the non-persistent memory circuitry is a DIMM comprising a plurality of Double Data Rate, DDR, memory devices.

5. The apparatus of claim 4, wherein the DIMM comprises DDR Input/Output circuitry and wherein the transitioning of the one memory sub-channel to the lower power mode further comprises sending a control signal to turn off a clock to the DDR Input/Output circuitry.

6. The apparatus of claim 3, wherein the one memory sub-channel on which there are no non-persistent memory transactions is a DDR sub-channel and wherein the transitioning of the DDR sub-channel to the lower power mode comprises the memory controller circuitry issuing a self-refresh command to the DDR sub-channel.

7. The apparatus of claim 3, wherein the DDR memory devices of the DIMM comply with the Joint Electron Device Engineering Council, JDEC, DDR5 memory specification or later.

8. The apparatus of claim 1, wherein the memory controller circuitry comprises a global memory controller component to control both the persistent memory transactions and the non-persistent memory transactions and comprises a local memory controller component dedicated to controlling the persistent memory transactions.

9. The apparatus of claim 8, wherein the local memory controller component is to route any persistent memory transactions upstream to the global memory controller and wherein the global memory controller is to allocate one of the two or more memory sub-channels for routing of the persistent memory transactions.

10. The apparatus of claim 9, wherein the global memory controller comprises a persistent memory scheduler to schedule persistent memory transactions and at least one non-persistent memory scheduler to schedule non-persistent memory transactions.

11. The apparatus of claim 10, wherein the global memory controller component is either a part of the persistent memory scheduler or cooperates with the persistent memory scheduler to route the persistent memory transactions to one of the two or more memory sub-channels.

12. The apparatus of claim 1, comprising processing circuitry to issue one or more memory transactions for the persistent memory circuitry or the non-persistent memory circuitry.

13. A dual inline memory module, DIMM, comprising:
two or more persistent memory devices;
local memory controller circuitry to control processing of persistent memory transactions corresponding to one or more of the persistent memory devices using two or more memory sub-channels, the two or more memory sub-channels to be shared with transactions of a non-persistent memory DIMM;
channel selection circuitry to redirect any currently pending persistent memory access transactions corresponding to one of the two or more memory sub-channels for which there are currently no active persistent memory transactions, wherein the redirection is to divert any pending transactions away from the one memory sub-channel to a different memory sub-channel, and wherein the channel selection circuitry preferentially directs persistent memory transactions to a sub-channel that has active non-persistent memory traffic.

14. The DIMM of claim 13, wherein the pending memory transactions of the one memory sub-channel are redirected upstream to global memory controller circuitry having scheduling circuitry for both the persistent memory DIMM and the non-persistent memory DIMM.

15. Global memory controller circuitry comprising:
first scheduling circuitry to schedule memory transactions corresponding to non- persistent memory transactions;
second scheduling circuitry to schedule memory transactions corresponding to non- persistent memory transactions; and
channel selection logic to select from two or more sub-channels, at least one sub-channel for servicing persistent memory transactions, the selection to avoid a sub-channel currently in a self-refresh mode of operation for processing the persistent memory transactions, wherein the channel selection logic preferentially selects a sub-channel that has active non-persistent memory traffic for servicing persistent memory transactions.

16. The global memory controller circuitry of claim 15, wherein at least one of the non-persistent memory transactions and the persistent memory transactions are DIMM transactions.

17. The global memory controller circuitry of claim 15, wherein the persistent memory transactions are to be performed by a persistent memory DIMM and wherein the channel selection logic is to put the persistent memory DIMM in a single sub-channel mode to avoid the sub-channel currently in the self-refresh mode of operation with respect to the non- persistent memory.

18. The global memory controller circuitry of claim 15, wherein the channel selection logic is to detect an absence of non-persistent memory transactions on a first sub-channel of the two or more sub-channels and, responsive to the detection, route the persistent memory transactions to a different one of the two or more memory sub-channels for servicing.

19. The global memory controller circuitry of claim 18, wherein, in response to there being no non-persistent memory transactions on first sub-channel, the channel selection logic is to issue a self-refresh command to the first sub-channel to perform self-refresh.

20. The global memory controller circuitry of claim 15, further comprising power control circuitry to transition the first sub-channel from a higher power mode to a lower power mode responsive to detection of there being no non-persistent memory transactions on the first sub-channel.

\* \* \* \* \*